United States Patent [19]

Paluch et al.

[11] Patent Number: 5,546,902
[45] Date of Patent: Aug. 20, 1996

[54] FUEL/GAS DELIVERY SYSTEM FOR INTERNAL COMBUSTION ENGINES

[75] Inventors: John W. D. Paluch, Mount Claremont; Stephen R. Malss, Woodvale; Lyle A. Gildersleeve, Brentwood; Christopher K. Schlunke, South City Beach; Gregory B. Bell, Woodlands; Darren A. Smith, Doubleview, all of Australia

[73] Assignee: Orbital Engine Company (Australia) Pty. Limited, Balcatta, Australia

[21] Appl. No.: 331,487
[22] PCT Filed: May 14, 1993
[86] PCT No.: PCT/AU93/00222
§ 371 Date: Nov. 7, 1994
§ 102(e) Date: Nov. 7, 1994
[87] PCT Pub. No.: WO93/23668
PCT Pub. Date: Nov. 25, 1993

[30] Foreign Application Priority Data

May 15, 1992 [AU] Australia ................... PL2477

[51] Int. Cl.$^6$ .......................... F02M 43/00; F02M 43/04; F02M 25/10; F02D 19/08
[52] U.S. Cl. ................... 123/304; 123/DIG. 12; 123/531; 123/533
[58] Field of Search ............... 123/25 C, 299, 123/300, 304, 531, 533, DIG. 12, 1 A

[56] References Cited

U.S. PATENT DOCUMENTS

| | | | |
|---|---|---|---|
| 2,777,430 | 1/1957 | Meurer | 123/25 C |
| 3,970,054 | 7/1976 | Henault et al. | 123/DIG. 12 |
| 4,111,161 | 9/1978 | Ueno et al. | 123/DIG. 12 |
| 4,140,090 | 2/1979 | Lindberg | 123/DIG. 12 |
| 4,343,272 | 8/1982 | Buck | 123/297 |
| 4,362,137 | 12/1982 | O'Hare | 123/DIG. 12 |
| 4,463,719 | 8/1984 | Pischinger et al. | 123/299 X |
| 4,546,740 | 10/1985 | Clements et al. | 123/304 |
| 4,596,210 | 6/1986 | Schmidtke | 123/531 X |
| 5,007,381 | 4/1991 | Kakegawa et al. | 123/DIG. 12 |
| 5,125,366 | 6/1992 | Hobbs | 123/25 C |
| 5,203,308 | 4/1993 | Liskow | 123/531 |

FOREIGN PATENT DOCUMENTS

| | | |
|---|---|---|
| 3828746 | 1/1990 | Germany . |
| 4129834 | 3/1993 | Germany . |
| 1455008 | 1/1989 | U.S.S.R. . |

*Primary Examiner*—Tony M. Argenbright
*Attorney, Agent, or Firm*—Nikaido, Marmelstein, Murray & Oram LLP

[57] ABSTRACT

Disclosed is a fuel/gas delivery system for use with operating an internal combustion engine in which quantities of a hydrocarbon fuel and hydrogen are introduced into the combustion chamber of the engine. The combustion chamber is provided with an igniter and the delivery of hydrogen is timed relative to both the delivery of the fuel and the activation of the igniter to establish an ignitable mixture at the igniter at the time of activation of the igniter.

31 Claims, 2 Drawing Sheets

FUEL/GAS DELIVERY SYSTEM FOR INTERNAL COMBUSTION ENGINES

This invention relates to the combustion process of an internal combustion engine and particularly to the enhancement of that process to reduce the level of exhaust emissions and/or improve combustion stability and/or otherwise enhance the combustion process.

All major industrial countries currently have regulations relating to the level of exhaust emissions from motor vehicles, particularly passenger type vehicles. The controlling authorities are progressively reducing the permitted level of emissions thereby increasing the demand for greater control of the combustion process of internal combustion engines. The regulations regarding the control of exhaust emissions apply a test procedure wherein engine operation at low to medium load is typically a significant factor and unfortunately these areas of operation of the engine present a substantial difficulty in control of the combustion process.

In the low to medium range of operation of an engine, the rate of fuel consumption is such that the distribution of fuel within the air charge in the combustion chamber is preferably of a stratified nature so that a sufficiently rich mixture exists in the vicinity of the ignition device to provide reliable initiation of combustion. The creation of the stratified fuel distribution is particularly difficult to achieve where the fuel is introduced into the air charge prior to the air charge entering the combustion chamber, particularly as the fuel must be delivered into the air charge at a time related to the engine cycle to ensure that all of the fuel reaches the combustion chamber before the inlet port is closed. Thus there is a substantial time interval for the fuel to disperse in the air charge both in the air intake system and in the combustion chamber before and after closing of the inlet port.

Some degree of success has been achieved in establishing a stratified charge by the use of a fuel injector to deliver the fuel into the air charge at a location only a relatively short distance upstream from the inlet port. This permits relatively late injection of the fuel and restricts the time available for dispersion of the fuel within the air charge. Further improvement has been obtained by the injection of the fuel directly into the combustion chamber. However, this introduces the further problem that the fuel must be injected at a near sonic velocity to achieve the necessary degree of atomisation of the fuel. Moreover, the high velocity also results in a significant dispersion of the fuel within the combustion chamber.

It has also been proposed to introduce an ignition enhancing substance together with the fuel/air charge to assist in the promotion of initial ignition of the fuel. Hydrogen is the preferred enhancing substance to be used in this procedure, but, due to its high rate of dispersion, approximately 10 times faster than oxygen, relatively large quantities of hydrogen are consumed, particularly where the fuel and hydrogen are introduced into the air charge prior to the delivery thereof to the combustion chamber. Also, as it is desirable for practical reasons to produce the hydrogen within the vehicle rather than merely to supply a reservoir of pre-produced hydrogen, the large consumption of hydrogen necessitates a substantial "on-board" hydrogen generating capacity which both consumes energy, occupies space in and adds weight to the vehicle.

It is also known that the introduction of other selected substances into the fuel/air charge in the combustion chamber of an engine can be beneficial to the management of the combustion process. Furthermore, it is also known that the effectiveness of some of these substances is related to the location of the substance within the fuel/air mixture such as its location relative to the combustion chamber walls, the fuel entry to the combustion chamber, the spark plug or like igniter, or the exhaust port. Thus, the ability to supply these substances to a particular location within the combustion chamber under particular engine operating conditions not only contributes to the enhanced performance but also reduces the consumption rate of the selected substance thus increasing the cost effectiveness of the use of the selected substance. The reference to 'substances' is to be understood to include specific elements, compounds of two or more elements, or mixtures of elements and/or compounds.

It is therefore the object of the present invention to provide a method of operating an internal combustion engine whereby the control of the combustion of the fuel/air charge is enhanced to thereby assist in the control of the level of vehicle exhaust emissions and/or improve combustion stability and/or otherwise enhance the combustion process in a manner which is both efficient and economic.

With this object in view there is provided a method of operating an internal combustion engine comprising delivering a quantity of fuel into a combustion chamber of the engine, and over at least a selected portion of the engine operating load range, injecting into the combustion chamber a quantity of a combustion control substance in timed relation to said delivery of the fuel and establishing at a selected location within the combustion chamber a selected fuel control substance distribution.

Conveniently, the injection of the control substance is preferably also in a timed relation to the ignition of the fuel.

The control substance can be an ignition enhancer wherein the selected location is the immediate vicinity of an ignition means located within the combustion chamber thereby improving the ignitability of the fuel/air mixture in the combustion chamber. This improved ignitability is advantageous when the engine is operating at low loads when the fuel/air mixture is lean and/or stratified.

Under other operating conditions, it can be desirable to deliver the control substance at a location adjacent the peripheral wall of the combustion chamber, such as, for example, an oxidant to assist in oxidation of hydrocarbons, or a knock suppressant including water or amonia. Also the control substance may be an additive to increase the octane rating of the fuel in order to control knock.

More specifically, there is provided a method of operating an internal combustion engine comprising delivery of respective quantities of a fuel and an ignition enhancement substance into a combustion chamber of the engine, the combustion chamber having a selectively operable igniter means located therein characterised in that said ignition enhancement substance is delivered directly into said combustion chamber in timed relation to the delivery of the fuel, preferably such that an enhanced ignitable mixture is established at the igniter means at the time of activation of the igniter means.

Preferably, the fuel is a hydrocarbon fuel and preferably the fuel is delivered directly into the combustion chamber either independently of, or together with, the ignition enhancement substance. Also, the combustion control substance is metered in accordance with engine operating conditions such as engine load and/or speed and/or in relation to the rate of fuel supply to the engine. Preferably, the combustion control substance is delivered to the combustion chamber only when the engine is operating in a selected load and/or speed range, such as the low to medium engine load range.

Conveniently, the combustion control substance is delivered into the combustion chamber entrained in a gas such as air, either independent of or in conjunction with the fuel.

Conveniently, the combustion control substance is hydrogen or a hydrogen rich gas. Preferably, the commencement of the delivery of the hydrogen to the combustion chamber occurs later in the engine cycle than the commencement of delivery of the fuel, and can occur after the completion of the delivery of the fuel to the combustion chamber. Because hydrogen has a high rate of dispersion, it is preferable that the hydrogen is delivered at this time so that there is sufficient time for the hydrogen to reach the vicinity of the igniter means and such that there is not sufficient time for the hydrogen to disperse to such an extent that the ignitability enhancement effect of the hydrogen in the fuel-air mixture is substantially lessened.

Preferably, the hydrogen is delivered into the combustion chamber in such manner as to minimise the dispersion of the hydrogen and to direct the hydrogen to the immediate vicinity of the igniter means.

In accordance with another aspect of the present invention, there is provided a method of operating an internal combustion engine comprising injecting respective metered quantities of a fuel entrained in air directly into an engine combustion chamber, and characterised in that a combustion control substance, such as an ignition enhancement substance, for example hydrogen, is introduced into the air to provide a substantially uniform air/control substance mixture for entrainment of the fuel.

Preferably, the control substance is introduced into the air only when the engine is operating in a selected engine load and/or speed range, such as, for example, the low-medium load or speed range of the engine in the case of hydrogen, or in the high load and/or speed range of the engine in the case of a knock control substance. The hydrogen or other control substance may be introduced into the air during the time period that control substance is required or it may be introduced cyclically, particularly when the control substance is hydrogen as it has a sufficiently high dispersion rate to provide a substantially uniform mixture before injection to the combustion chamber.

The invention also provides, in another aspect, an apparatus for delivering fuel to an internal combustion engine comprising a fuel injection means operable to inject independent metered quantities of fuel entrained in air into a combustion chamber of the engine, the fuel injection means being communicable with the combustion chamber through a selectively openable delivery port, a selectively operable igniter means located in the combustion chamber to ignite the fuel, and a combustion control substance delivery means to deliver a combustion control substance directly to the combustion chamber in timed relation to the injection of the fuel.

Conveniently, the control substance is delivered to the combustion chamber in admixture with air.

In one alternative construction the control substance delivery means may be arranged to deliver a control substance to the fuel injection means whereby the control substance and the fuel are delivered entrained together in air to the combustion chamber.

In another alternative, the control substance delivery means delivers independently and directly to the combustion chamber. However, the control substance delivery means is activated in timed relation to the activation of the fuel injection means and conveniently by the same activating mechanism as the fuel injection means.

The control substance delivery means is desirably provided with metering means to meter the quantity of the control substance delivered to the fuel injection means or combustion chamber. Such metering may be operable in accordance with engine operating conditions, such as engine load and/or speed and/or in relation to the rate of fuel supply to the engine. Preferably, the control substance delivery means delivers only when the engine is operating in a selected load and/or speed range, such as the low to medium engine load range. The control substance delivery means only delivers for the time that the relevant engine operating condition subsists or cyclically.

Preferably, the control substance is hydrogen and the delivery means delivers hydrogen to the immediate vicinity of the igniter means in the combustion chamber, for example, by a nozzle located in the cylinder head adjacent the igniter means and may be incorporated in or mounted on the ignition means to direct a stream of hydrogen at an electrode of the igniter means.

Where air is introduced to the fuel injection means by a compressor the hydrogen delivery means may conveniently introduce hydrogen to the air at the compressor either at the inlet or outlet side thereof. Where a combustion air/fuel rail is employed, the problem of introducing hydrogen to high pressure air may be avoided by the utilisation of this means.

The introduction of hydrogen with the fuel to the combustion chamber potentially results in a number of advantages for the operation of the internal combustion engine. These advantages arise from the improved ignitability of the fuel/air mixture caused by introduction of hydrogen therewith to the combustion chamber. Some of these advantages are as follows:

1. The air/fuel ratio is less critical to the ignitability of the charge and charges with air/fuel ratios up to as lean as 40:1 at the igniter means can be acceptable or as rich as 5:1 at the igniter means.

2. The hydrocarbon (HC) and CO content of the exhaust gas is reduced.

3. Improved engine stability at low temperature operation is achieved due to the improved ignitability of the mixture.

4. It is not necessary to select an ignition timing dictated by the requirements of ignitability and thus the spark advance may be set at a minimum for best torque (MBT). This spark setting also contributes to the reduction of NOx and improved fuel consumption.

5. Usage of hydrogen has been found to enable a greater use of Exhaust Gas Recirculation (EGR) for the reduction of emissions. The Exhaust Gas Recirculation (EGR) method is disclosed in Orbital Engine Company Pty. Limited's International Application WO 94/16207.

As the present invention enables the injection of the hydrogen directly into the combustion chamber, which injection event preferably occurs independently of the fuel delivery, it has been found that only relatively small amounts of hydrogen are required to achieve the desired improvement in the ignitability of the fuel/air mixture, even in stratified charge engines. Substantial improvement in the combustion process has been achieved with as little as 2% hydrogen injection in relation to the fuel charge. This contrasts with the prior art where it was discovered that when the hydrogen is introduced to the air charge prior to entering to the combustion chamber, hydrogen requirements as high as 10% or more were necessary to obtain the same improvements in the combustion process. The low hydrogen usage enabled by the invention enhances the possibility of providing an economical means of producing sufficient quantities of hydrogen on-board a vehicle, perhaps by using a compact catalytic process.

The invention will be more readily understood from the following description of several practical embodiments of the control supply of hydrogen to the engine combustion chamber and with reference to the accompanying drawings. It is to be understood that although the following description with reference to the drawings is specifically related to the delivery of hydrogen to the combustion chamber the same general construction can be used to deliver other combustion control substances to the combustion chamber and to direct that control substance to appropriate locations within the combustion chamber.

Figure 1:
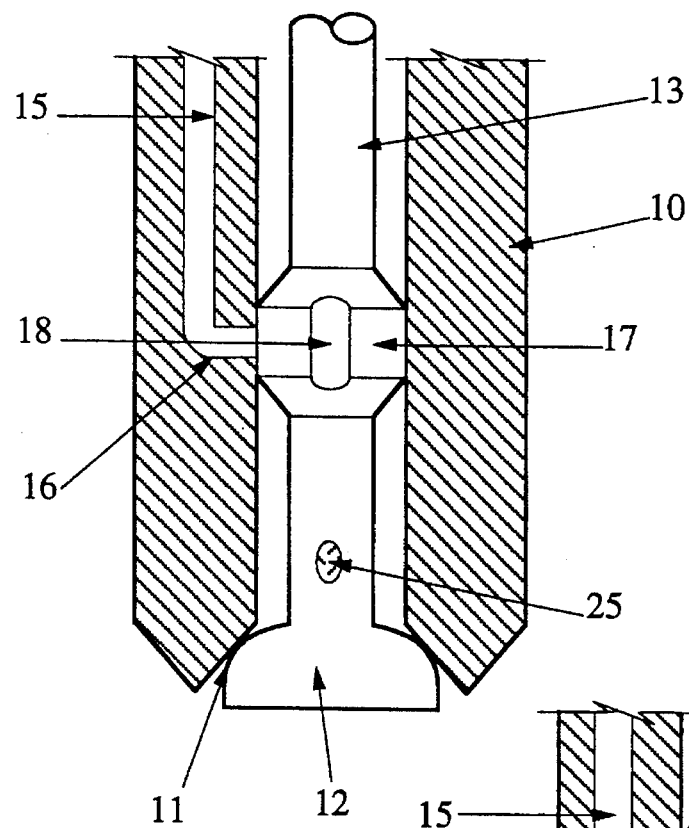
FIG. 1 is a cross-sectional side view of a portion of a fuel injector nozzle incorporating hydrogen supply means.

Referring now to FIG. 1 of the drawings, the construction of the fuel delivery nozzle incorporating a hydrogen supply means comprises a hollow cylindrical body 10 having an outlet port 11 at the lower extremity thereof and a valve member 12 mounted on a valve stem 13. The valve member 12 is selectively movable to open and close the outlet port 11 for the delivery of a fuel/air mixture. The movement of the valve member 12 to open and close the outlet port 11 is normally effected by a selectively energisable solenoid under the control of an ECU as is well known in the fuel injection art.

The nozzle body 10 has a passage 15 provided in one wall thereof which communicates with a hydrogen supply (not shown) and which terminates in a bleed port 16 in the internal wall of the nozzle body 10. The valve stem 13 has an enlarged portion 17 of a diameter selected to ensure a close sliding fit within the bore of the body 10. The enlarged portion 17 provides a support for the valve stem 13, centrally in the bore of the nozzle body 10, particularly when the valve member 12 is in the open position. The enlarged portion 17 is not required to be in contact with the internal surface of the nozzle body 10 about the whole periphery thereof, and may be in such contact at a plurality of locations about the periphery of the nozzle body 10 so as to centrally locate the valve stem 13 within the bore.

However, the enlarged portion 17 of the valve stem 13 is in a close sliding contact with the internal surface of the bore of the nozzle body 10 in the area where the bleed port 16 is located so as to provide control over the opening and closing of the bleed port 16. Therefore, the contact between the enlarged portion 17 and the internal surface of the nozzle body 10 is arranged so that when the valve member 12 is in the closed position, the bleed port 16 will also be closed by the engagement of the enlarged portion 17 with the internal surface of the bore of the nozzle body 10, thus preventing the flow of hydrogen through bleed port 16 into the bore of nozzle body 10.

Figure 2:
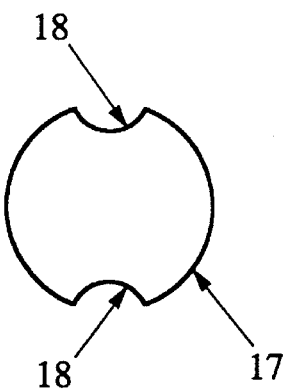
FIG. 2 is a schematic diagram illustrating the cross-sectional geometry of the enlarged portion of the valve stem as shown in FIG. 1.

Further, the enlarged portion 17 is proportioned so that when the valve member 12 is moved to the open position, the bleed port 16 is exposed so that hydrogen available in the passage 15 is enabled to flow into a lower portion of the internal bore of the nozzle body 10 via a groove or grooves 18, formed in the enlarged portion 17 of the valve stem 13. Two grooves 18 are shown in FIG. 2. Nonetheless, it should be apparent that any suitable number or geometry of the groove or grooves 18 may be employed. Therefore, when the valve member 12 is open, hydrogen passes through the grooves 18 and subsequently open outlet port 11.

By suitable selection of the dimensional relationship of the enlarged portion 17 with respect to the bleed port 16 and the valve member 12, various timed relationships can be obtained between the opening and closing of the outlet port 11 of the nozzle and the opening and closing of the bleed port 16. In the preferred arrangement, the bleed port 16 is open for a shorter interval of time than the outlet port 11. Furthermore, the opening of the bleed port 16 is preferably delayed with respect to the opening of the outlet port 11. In this way, the hydrogen gas is delivered to the combustion chamber later than the fuel and there is thus less time available for dispersion of the hydrogen prior to ignition of the fuel/hydrogen/air mixture.

Figure 3:
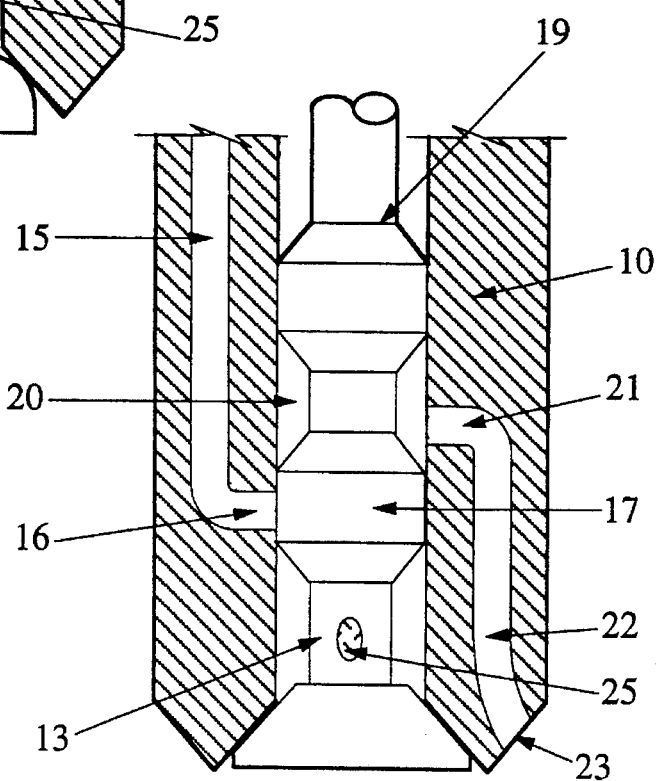
FIG. 3 is a cross-sectional side view of a fuel injector nozzle with an alternative form of hydrogen supply means.

FIG. 3 shows a modification to the construction in FIG. 1 wherein two enlarged portions 17 and 19 are provided on the valve stem 13, with each of the enlarged portions 17 and 19 being in contact with the internal surface of the bore of the nozzle body 10 about the complete periphery of the respective enlarged portions 17 and 19. In this way, an isolated chamber 20 is provided between the enlarged portions 17 and 19. In addition to the bleed port 16 in the wall of the nozzle body 10, there is, in this embodiment, provided a fuel delivery port 21 connected by the passage 22 to the injection port 23.

It can thus be seen that in this alternative construction, the hydrogen is delivered from a separate delivery port 21 to the injection port 23 which is appropriately located to direct the hydrogen to the area of the spark plug located within the combustion chamber to promote the formation of an ignitable mixture in the immediate vicinity thereof. The timing of the delivery of the hydrogen may also be delayed, at least with respect of the commencement of the delivery of the fuel to the combustion chamber as previously described.

It will also be understood that passage 22 and port 23 may be located and configured to deliver the hydrogen in a wide range of directions depending upon where it is desired to concentrate the hydrogen or other combustion control substance within the combustion chamber. In particular the combustion control substances may not be required to be concentrated in the vicinity of the spark plug of the combustion chamber.

In both of the above described constructions, the fuel preferably passes through the valve stem 13 which is of a hollow construction and has one or more outlet apertures 25 in the area immediately above the valve member 12 and below the enlarged portion 17.

Figure 4:
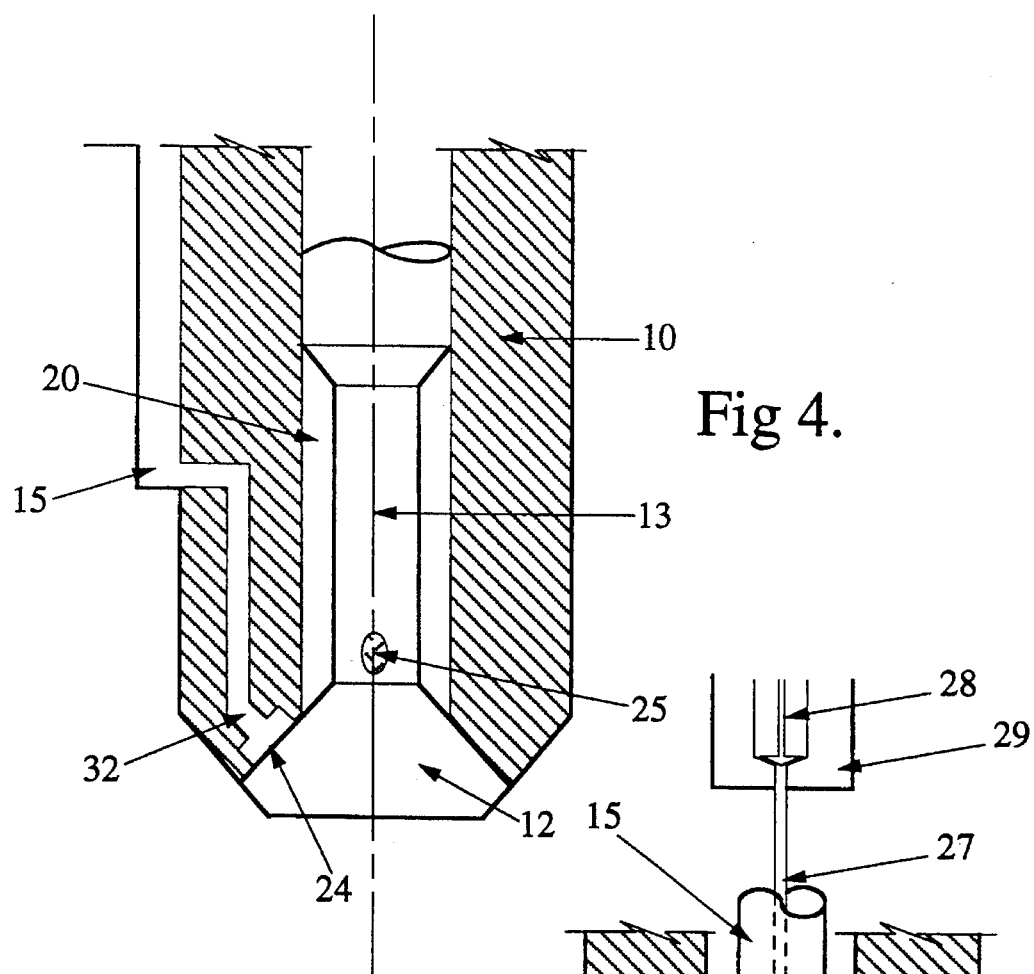
FIG. 4 is a cross-sectional side view of a fuel injector nozzle incorporating a further form of hydrogen supply means.

Another construction is shown in FIG. 4, which illustrates a nozzle wherein hydrogen travels through passage 15 and orifice 32 to the cavity 24 thus to be injected to the combustion chamber of an engine with minimal mixing of fuel, air and hydrogen prior to injection.

Figure 5:
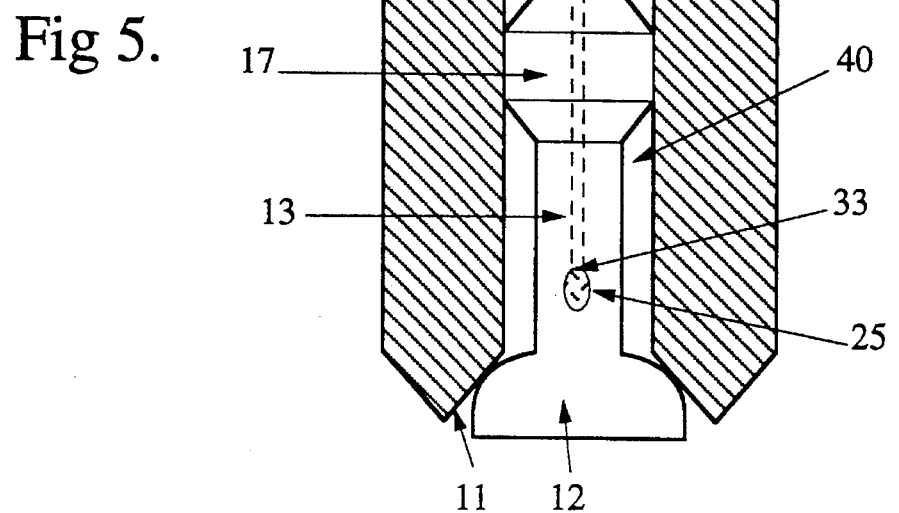
FIG. 5 is a cross-sectional side view of a fuel injector nozzle incorporating a still further form of hydrogen supply means.

In a further modification, as shown in FIG. 5, the hydrogen may be delivered through a separate passage 27 and associated control valve 28, such as a solenoid actuated valve, in a metering unit 29, which controls the timing and duration of the delivery of the hydrogen. In the construction shown, hydrogen travels through a needle-like body having formed therein the fuel supply passage 27 to an exit point 33 aligned with the outlet aperture 25. In this way, mixing of hydrogen with air passing either through the interior of the hollow nozzle body 10 or valve stem 13 is prevented until injection. Alternatively, the hydrogen can be delivered to the combustion chamber of the engine separately from the fuel in a manner similar to that described with reference to FIG.

3 or delivered directly through the bore of the nozzle body 10 for delivery to the combustion chamber of the engine through the fuel injector nozzle, as described with reference to FIG. 1.

Also the valve 28, metering unit 29 and passage 27 can be arranged at any desired location relative to the combustion chamber depending on the desired location of the combustion control substance within the combustion chamber. Thus, for example, it may be located adjacent the spark plug or be incorporated in the body of the spark plug.

Further, where the fuel is delivered to the combustion chamber entrained in air, the air can be supplied through the central axial bore 40 of the cylindrical nozzle body 10 of a fuel injector nozzle of the construction as previously described with reference to FIGS. 1 and 3. In such fuel injection systems, the hydrogen can be delivered into the air at a location upstream from the fuel injector, by a suitably controlled valve such as a solenoid actuated valve, operated by a suitably programmed ECU. Although this proposal results in the hydrogen being available for dispersion in the air for a greater time period than in the embodiments of FIGS. 1 and 3, the quantity of air is substantially less than is available when the hydrogen is delivered into the air induction manifold or otherwise introduced into the induction air.

It is not intended that the invention be limited to hydrogen in its pure state or even in admixture with other gases. The principles discussed above are equally applicable to the injection of any other gases that can, for example, be used to improve combustion stability and/or otherwise enhance the combustion process such as by reducing the tendency to knock or reduce emissions. As examples may be mentioned nitrogen/recycled exhaust gas mixtures, oxygen and mixtures containing oxygen. Mixtures of hydrogen and other appropriate gases may also be utilised.

It is also to be understood that the supply of hydrogen or other combustion control substances can be controlled in respect of quantity delivered per combustion chamber per cycle thereof, such as by the ECU control of the metering unit 29. Thus, where a hydrogen production facility is provided on board the vehicle, the hydrogen may be stored and metered to the engine as required by engine operating conditions, such as during acceleration or cold start where hydrocarbon production is high.

We claim:

1. A method of operating an internal combustion engine comprising directly injecting a quantity of fuel entrained in air into a combustion chamber of an engine, and over at least a selected portion of the engine operating load range delivering into the combustion chamber a quantity of a combustion control substance in timed relation to said injecting of the fuel and establishing at a selected location within the combustion chamber a selected combustion control substance distribution.

2. A method as claimed in claim 1 wherein said combustion control substance is delivered to said combustion chamber only when the engine is operating in a selected load and speed range.

3. A method of operating an internal combustion engine comprising delivering a quantity of fuel into a combustion chamber of the engine; and, only over a selected portion of the engine operating load range delivering into the combustion chamber a quantity of a combustion control substance in timed relation to said delivery of fuel and establishing at a selected location within the combustion chamber a selected combustion control substance distribution.

4. A method of operating an internal combustion engine as claimed in claim 1 or 2 wherein the combustion control substance is delivered into the combustion chamber entrained in air.

5. A method as claimed in claim 1 or 3 wherein the combustion control substance is injected into the combustion chamber admixed with air and the fuel.

6. A method as claimed in claim 1 or 3 wherein said combustion control substance is delivered to said combustion chamber when the engine is operating in a low to medium engine load range.

7. A method as claimed in claim 1 or 3 characterised in wherein said delivery of the combustion control substance to said combustion chamber is effected a sufficient time before ignition such that said control substance reaches the immediate vicinity of an igniter means located within said combustion chamber prior to ignition.

8. A method as claimed in claim 1 or 3 wherein said combustion control substance is delivered directly to the combustion chamber in an immediate vicinity of an igniter means located within said combustion chamber prior to ignition.

9. A method as claimed in claim 1 or 3 wherein the combustion control substance is an ignition enhancer.

10. A method as claimed in claim 9 wherein the ignition enhancer is hydrogen.

11. A method in claim 1 or 3 wherein hydrogen is delivered to the combustion chamber during at least one of engine start-up or acceleration.

12. A method of operating an internal combustion engine comprising injecting respective metered quantities of fuel entrained in air directly to an engine combustion chamber and characterised in that a combustion control substance is introduced into said air to provide a substantially uniform air/combustion control substance mixture for entrainment of the fuel.

13. A method as claimed in claim 12, wherein said combustion control substance is introduced into said air when said engine is operating in at least one of a selected engine load and speed range.

14. A method as claimed in claim 13, wherein said selected range is a low to medium engine load or speed range.

15. A method as claimed in claim 12 wherein said air for entrainment of said fuel is supplied by a compressor and said combustion control substance is introduced into said air at said compressor.

16. A method as claimed in claim 15 wherein the combustion control substance is introduced into said air on the outlet side of said compressor.

17. A method as claimed in claim 12 wherein said combustion control substance is an ignition enhancer.

18. A method as claimed in claim 17 wherein the ignition enhancer is hydrogen.

19. An apparatus for delivering fuel to an internal combustion engine comprising a fuel injection means operable to inject independent metered quantities of fuel entrained in air into a combustion chamber of the engine, the fuel injection means being communicable with the combustion chamber through a selectively openable fuel delivery port, and combustion control substance delivery means to deliver a combustion control substance to the combustion chamber in timed relation to the injection of the fuel.

20. Apparatus as claimed in claim 19 wherein said combustion control substance delivery means is adapted to deliver said control substance to said fuel injection means prior to delivery thereof to said combustion chamber.

21. Apparatus as claimed in claim 19 wherein said delivery means is operable in timed relation to the opening of said fuel delivery port.

22. Apparatus as claimed in claim 19, wherein said delivery means and said fuel delivery port are operated by the same activating means.

23. Apparatus as claimed in claim 19, wherein said control substance delivery means is adapted to deliver said control substance in response to the engine operating in at least one of a selected load and speed range.

24. Apparatus as claimed in claim 19, wherein said control substance delivery means is adapted to deliver said control substance to the immediate vicinity of igniter means provided in said combustion chamber.

25. Apparatus as claimed in claim 24, wherein said control substance delivery means is at least one of incorporated in and mounted on said igniter means.

26. Apparatus as claimed in claim 19, wherein said fuel injection means includes a body having an axial bore connectable to an air supply and connected at one end to said fuel delivery port, a valve operable to open and close the port and a valve stem attached to the valve and extending within the axial bore, the valve stem having an axial fuel passage therethrough communicating with the axial bore adjacent the port, said stem being axially movable in its bore to open and close the valve.

27. Apparatus as claimed in claim 26 wherein said control substance delivery means is selectively communicated with said axial bore in response to the opening of the port to deliver a combustion control substance into said bore.

28. Apparatus as claimed in claim 26 wherein said control substance delivery means includes a further passage in said body of said fuel injection means communicating with the combustion chamber, and means are provided to selectively open and close said further passage in timed relation to the opening and closing of the port.

29. Apparatus as claimed in claim 28 wherein said further passage delivers a combustion control substance to the combustion chamber in the vicinity of an igniter means.

30. Apparatus claim 19 wherein the combustion control substance is hydrogen.

31. Apparatus as claimed in claim 26 wherein the combustion control substance is hydrogen.

* * * * *